United States Patent [19]

Braun et al.

[11] 4,277,310

[45] Jul. 7, 1981

[54] WATER-COOLED NUCLEAR REACTOR

[75] Inventors: Wolfgang Braun, Buckenhof;
Leonhard Irion, Rückersdorf, both of
Fed. Rep. of Germany

[73] Assignee: Kraftwerk Union Ag, Mulheim an der
Ruhr, Fed. Rep. of Germany

[21] Appl. No.: 577,874

[22] Filed: May 15, 1975

[30] Foreign Application Priority Data

May 20, 1974 [DE] Fed. Rep. of Germany ....... 2424427

[51] Int. Cl.³ .................... G21C 9/00; G21C 15/00
[52] U.S. Cl. .................................. 176/50; 176/38; 137/512.1
[58] Field of Search ............... 176/50, 61, 38; 137/512.1, 527

[56] References Cited

U.S. PATENT DOCUMENTS

| 680,245 | 8/1901 | Gutermuth | 137/512.1 |
|---|---|---|---|
| 2,636,510 | 4/1953 | Mercier et al. | 137/512.1 |
| 3,047,485 | 7/1962 | Ellis | 176/38 |
| 3,118,467 | 1/1964 | Kuhn | 137/512.1 |
| 3,201,319 | 8/1965 | Hackney et al. | 176/61 |
| 3,258,405 | 6/1966 | Silvers | 176/61 |
| 3,357,892 | 12/1967 | Schmidt | 176/38 |
| 3,483,824 | 12/1969 | Sprague | 137/512.1 |
| 3,623,948 | 11/1971 | Dotson et al. | 176/50 |
| 3,640,306 | 2/1972 | Vogt | 137/512.1 |
| 3,713,969 | 1/1973 | Cahill, Jr. | 176/50 |
| 3,837,268 | 9/1974 | Alley | 137/512.1 |
| 3,850,796 | 11/1974 | Thome | 176/50 |
| 3,864,209 | 2/1975 | Tong | 176/50 |

*Primary Examiner*—Harvey E. Behrend
*Attorney, Agent, or Firm*—Kenyon & Kenyon

[57] ABSTRACT

A water-cooled nuclear reactor pressure vessel is internally provided with a check valve assembly for the inner end of a coolant inlet nozzle to prevent immediate loss of the coolant from the vessel by backward flow in the event the pressure of the coolant supply through the nozzle, drops below the pressure inside the vessel while the reactor is operating. The valve assembly includes a plurality of flap valves working in parallel so that if one fails to close when required, the balance of the flap valves remain operative to check the discharge of the coolant.

6 Claims, 12 Drawing Figures

WATER-COOLED NUCLEAR REACTOR

BACKGROUND OF THE INVENTION

The pressure vessel containing the core of water-cooled nuclear reactors in general, requires a continuous supply of water coolant to continuously carry heat away from the core. Even a momentary interruption in the coolant supply can result in serious damage to the core even though the core is thereafter promptly supplied with emergency core cooling water.

For example, a pressurized-water reactor normally comprises a pressure vessel containing a core barrel, in which the core is mounted, the core barrel being cylindrical and spaced from the inside of the cylindrical pressure vessel to form an annular space. At its top the barrel has a support flange which rests on a flange formed on the inside of the pressure vessel, the arrangement being such that the annular space is closed by the flanges from the balance of the area inside of the pressure vessel.

For core cooling, a coolant inlet nozzle opens through the pressure vessel wall into the upper portion of the above annular space, and a coolant outlet nozzle opens from the inside of the upper portion of the core barrel. The top and bottom of the core barrel are open. The reactor coolant system forms a pipe loop comprising a hot leg pipe welded to the pressure vessel's outlet nozzle and connecting with a steam generator, a cold pipe leg coming from the steam generator, via a coolant circulating pump, and back to the pressure vessel's inlet nozzle to which the pipe is welded. For a power reactor, the reactor coolant system normally includes a multiplicity of such coolant loops, the pressure vessel having coolant inlet and outlet nozzles for each loop. A pressurizer connected to the loop or loops keeps water coolant in the loops and in the pressure vessel under a pressure preventing the water from boiling, although operating at temperatures much above the boiling point of water at atmospheric pressure. The pressurized-water fed through the inlet nozzle, in the case of each loop, flows downwardly in the annular space between the core barrel and the pressure vessel inside, to the bottom of the vessel where the pressurized-water coolant rises up the core within the core barrel and flows outwardly through the coolant nozzle outlet, this circulation via the coolant loop being continuous.

In the event such a pressurized-water main coolant loop ruptures at any point, the loop pressure drops with a consequent drop in the pressure in the water on the pressure vessel, and the water in the pressure vessel rather immediately vaporizes and discharges in the direction of the leak, assuming the leak to be of major proportions. In such an event, the reactor protection system normally scrams the core while the emergency core cooling system forces emergency cooling water into the vessel, all this occurring as rapidly as possible. Even so, there is the chance that the vessel might become emptied of water coolant before such systems can become fully effective, and there is always the remote hypothetical possibility that one or another of the systems might not operate.

German Offenlegungsschrift No. 1,564,654 suggests that a check valve be positioned in one of the coolant pipes of such a pressurized-water reactor main coolant loop. Apparently the idea is that in the event of a break in the pipe line on the side of the check valve away from the pressure vessel, the check valve will be closed by the reversely flowing coolant discharging from the pressure vessel, thus preventing emptying of the pressure vessel, at least immediately.

There are objections to the above proposal. A check valve of the size required necessarily involves a large movable valve plate which because of the size involved, does not provide positive assurance of operation, and the fabrication cost of such a valve is very high. Provision of a safety redundancy by using two such valves in series, is an extremely expensive expedient. Furthermore, any break in the pipe line or connection between such a check valve and the pressure vessel nozzle, makes the check valve useless for its intended purpose.

SUMMARY OF THE INVENTION

According to the present invention, each cold leg coolant inlet nozzle of the reactor pressure vessel, is internally provided with a check valve assembly inside of the pressure vessel. Each assembly comprises a multiplicity of individually swinging flap valves and means for mounting the flap valves so that they operate in parallel and are interposed in the coolant flow as it enters the vessel. The flap valves are mounted so that they are swung open by the incoming coolant flow, but will flap closed by a reverse coolant flow such as can occur in the event of a leak causing a pressure reduction at the inlet nozzle. Each flap valve may be formed by a relatively small rectangular plate which is pivotally mounted, so the fabrication cost of the assembly is relatively low. The simplicity of flap valves provides a large assurance that each will operate, but if one or more fails to operate when required to block the accidental discharge of coolant from the pressure vessel, the balance of the flap valves are certain to operate so as to greatly retard the loss of coolant from the vessel. Flap valve operation is not only very certain, but it is substantially immediate.

The flap valves can be mounted by an annular frame surrounding the inner end of the vessel's cold leg or inlet nozzle, the annular frame being formed with the cylindrical contour of the core barrel and preferably mounted by the latter, the annular frame having a radial extent substantially filling the annular space between the barrel and vessel.

In another form, the annular frame can surround the core barrel below each of a number of cold leg inlet nozzles, in which case the frame can perform the function of bracing the core barrel by means of the pressure vessel inside, and of serving all of the cold leg inlet nozzles of the pressure vessel. In this way only a single valve assembly is required for a multiplicity of pipe loop cold legs. When the assembly surrounds the inlet nozzle, the flow through the assembly is radial, with the flap valves appropriately oriented, and when the assembly surrounds the core barrel as just described above, the flow is axial to the frame, again with the flap valves appropriately oriented for this flow direction. In either case the annular check valve assemblies can be fastened to the core barrel so that, during reactor core servicing, the core barrel can be removed, carrying the check valve assembly or assemblies with it, permitting check valve inspection if desired.

By making each check valve assembly an integrated unit subsequently fixed to the core barrel during assembly of the reactor, the manufacturing costs involved by the present invention can be kept low.

BRIEF DESCRIPTION OF THE DRAWINGS

Examples of the present invention are schematically illustrated by the accompanying drawings, in which.

DETAILED DESCRIPTION OF THE INVENTION

Figure 1:
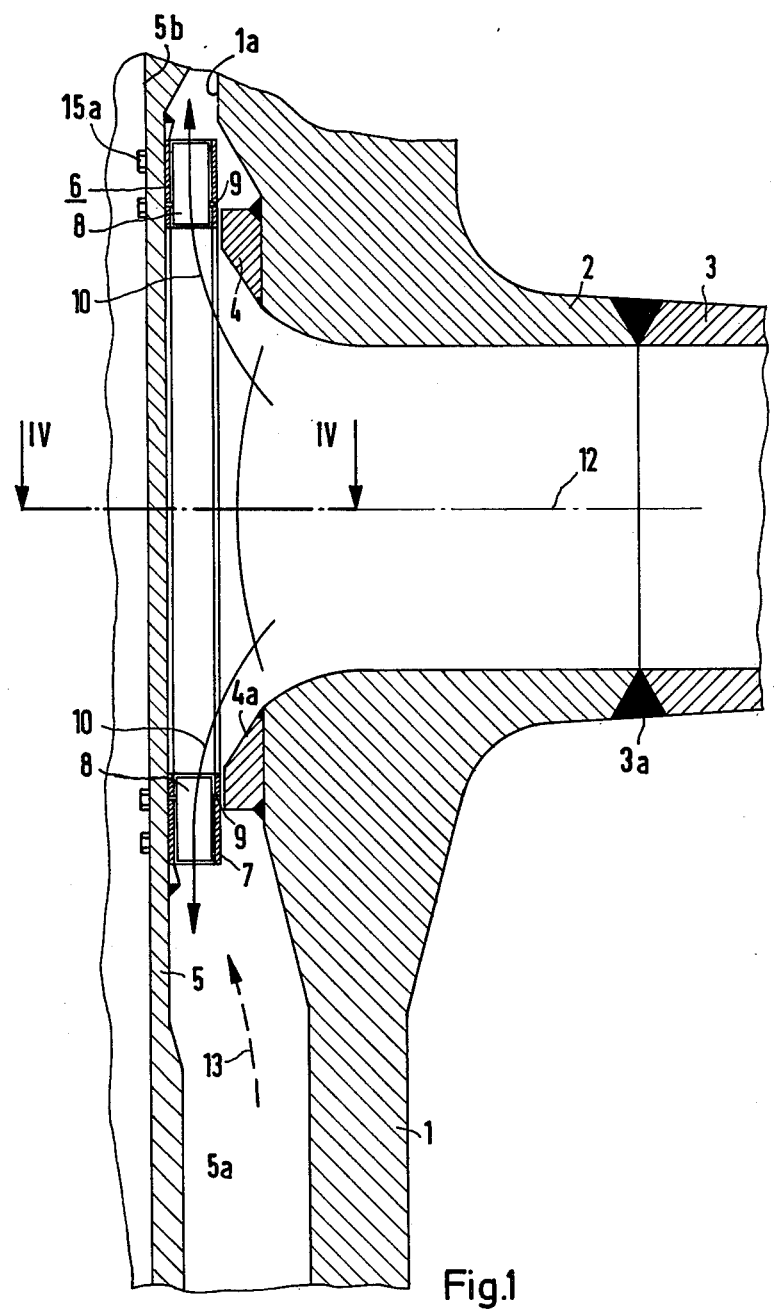
FIG. 1 in vertical section shows an example of the check valve surrounding the inlet end of the cold leg nozzle of a pressure vessel.

Having reference to the above drawings, FIG. 1 shows a portion of the cylindrical wall 1 of the pressure vessel of a pressurized-water reactor. The portion shown includes the inlet nozzle 2 to which the cold leg pipe 3 is connected by welding 3a. As previously described, this cold leg pipe is part of one of the reactor's main coolant systems, the pipe 3 returning pressurized-water coolant to the pressure vessel, under the force of the main coolant pump, the core heat having been substantially removed from the coolant by its passage through the usual steam generator which received the coolant from the pressure vessel by way of its coolant outlet nozzle and the hot pipe leg of the main coolant loop. Other than for the portion of the cold leg pipe 3, the details just referred to are not illustrated because they are conventionally included as part of any pressurized-water reactor installation.

In the present instance, the conventional construction of the pressure vessel is modified to the extent that an annular ring 4 is welded to the inside of the pressure vessel wall around the inner end of the nozzle 2, the inner periphery of this ring being flared as at 4a to provide to some extent streamlining for the incoming flow of pressurized coolant delivered by the cold leg pipe 3. The usual core barrel 5, in a lower portion of which the core (not shown) is mounted, forms the annular space 5a down through which the coolant flows for ultimate upwardly travel within the interior of the core barrel and out from the pressure vessel wall by way of the hot leg pipe nozzle (not shown). The space 5a is separated from the space above the upper portion of the core barrel by being sealed by the flange mounting of the core barrel as previously described, FIG. 1 showing the beginning of this flange at 5b.

The axial thickness of the ring 4 is such that its inner face is approximately flush to the cylindrical inside 1a of the pressure vessel extending above the nozzle 2. During servicing of the reactor, it may be desirable to remove the core barrel 5 upwardly, the inside diameter of the surface 1a defining the clearance area above the nozzle 2, through which the core barrel must travel for its removal.

In the example of the check valve 6 shown by FIGS. 1 through 4, an annular frame 7 of somewhat larger inside diameter than that of the nozzle 2, mounts the multiplicity of individually swinging flap valves 8, each comprising a plate of rectangular contour supported on a pivot pin 9, the frame 7 being of rectangular x-section and the pivot pins 9 being all mutually parallel with each other and with the axis 12 of the annular frame 7.

Figure 2:
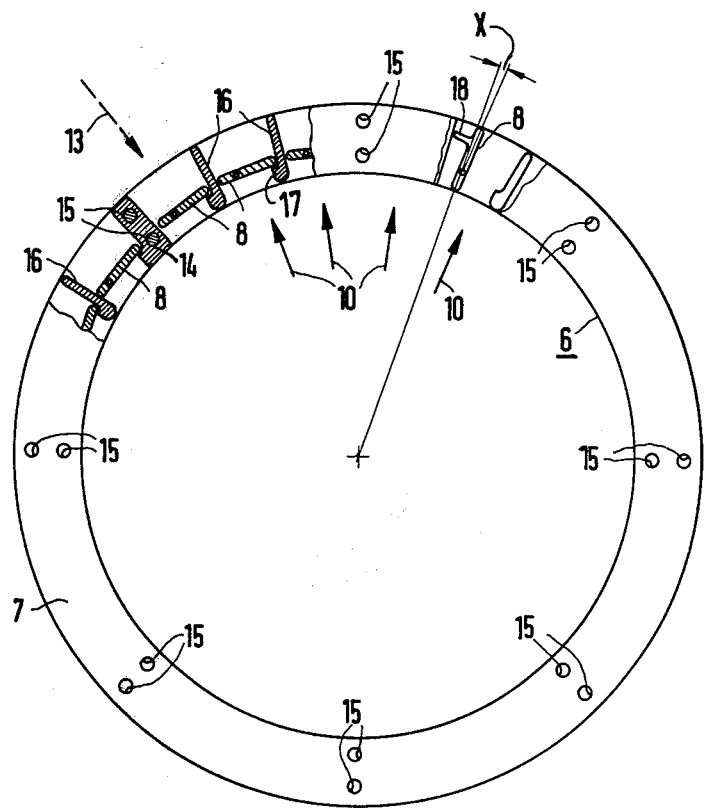
FIG. 2 is a partially sectioned side view of the check valve assembly alone.

As shown by FIG. 2, the annular frame 7 provides a large number of radial flow paths which are each provided with one of the flat valves 8, the paths being formed by eight relatively thick radial baffles 14 each having screw holes 15, two thinner guide surfaces or vanes 16 being interposed between each two of the thicker baffles or vanes 14. On their sides facing the swinging ends of the flap valves, the veins or guide elements 14 and 16 each provide a shoulder 17 on which the flap valves can seat when in their closed positions, the opening positions of the flap valves being limited by each being provided with a post 18 proportioned to hold the flap valves from swinging into alignment with the coolant flow indicated by the arrows 10. The flap valves are held diagonally against the coolant flows by the posts or stops 18, the angularity being such that during the normal flow 10, the dynamic force of the flows holds the flap valves rigidly open against chattering. The flap valve angularity need not be great, an example being indicated at X in FIG. 2.

The thicker radial vanes 14 provide the annular frame with rigidity in its axial direction and provides for mounting the frame on the core barrel 5, the holes 15 receiving cap screws 15a passed through suitable holes formed in the core barrel. This barrel is, of course, cylindrical, and the frame of the check valve 6 forms a cylindrical segment fitting the side of the core barrel 5. The axial thickness of the frame is dimensioned so that when the core barrel is removed, the check valve can clear the surface 1a previously referred to.

During the normal coolant flow shown by the arrows 10, all of the flap valves are held rigidly open by the force of the coolant flow. In the event the pressure drops, as for example there being a break in the weld connection 3a, the flow reverses as indicated by the broken line arrow in FIG. 1. Should this occur, the slight angularities of the flap valves provide surfaces for the reverse flow to cause the flap valve to snap shut substantially immediately. This simplicity and reliability of such flap valves should assure that they all snap shut, but should one or more fail, the multiplicity of valves provided assures that the majority will close so that coolant discharge from the vessel is largely prevented.

Figure 3A:
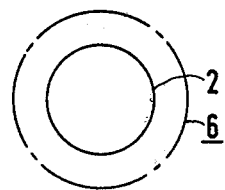
FIG. 3a is a diagram showing one possible arrangement of the annular check valve relative to the inner end of the nozzle.
Figure 3B:
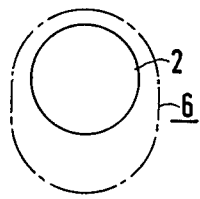
FIG. 3b is like FIG. 3a but shows a second and preferable possibility.

As shown in FIG. 3a, the check valve 6 can be positioned concentrically with respect to the nozzle 2. However, during the normal operation of the reactor, the coolant flow is downwardly through the annular space 5a. Therefore, to decrease the flow resistance offered by the new check valve, it may be positioned eccentrically with respect to the nozzle 2, as shown by FIG. 3b, and in such a case the annular frame can be elongated in the manner of an oval or its equivalent, thus putting the majority of the flap valves and their radial passages in positions where they pass the downward coolant flow to a major extent.

The total flow cross-sectional area is the sum of the areas of the radial passages which are, in turn, determined by the areas of the flap valves 8, and the total cross-sectional flow area of the check valve should substantially equal the cross-sectional area of the nozzle's inside. It is easy to design the construction shown by FIG. 2, to provide it with a total flow passage area substantially equaling that of the nozzle 2.

Figure 4:
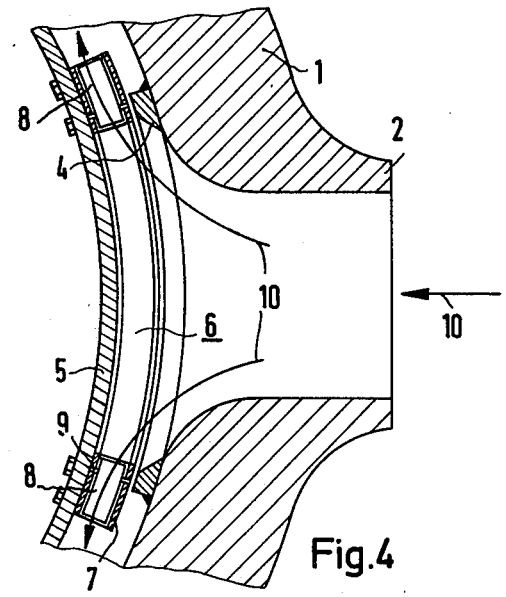
FIG. 4 is a cross section taken on the line IV—IV in FIG. 1.

FIG. 4 shows the cylindrically segmental shape of the check valve and it and FIG. 1 both show that although the annular welded ring 4 comes close to sealing the check valve against leakage around the outside of its frame, a small space is left as required to accommodate thermal expansion and contraction movements.

Figure 5:
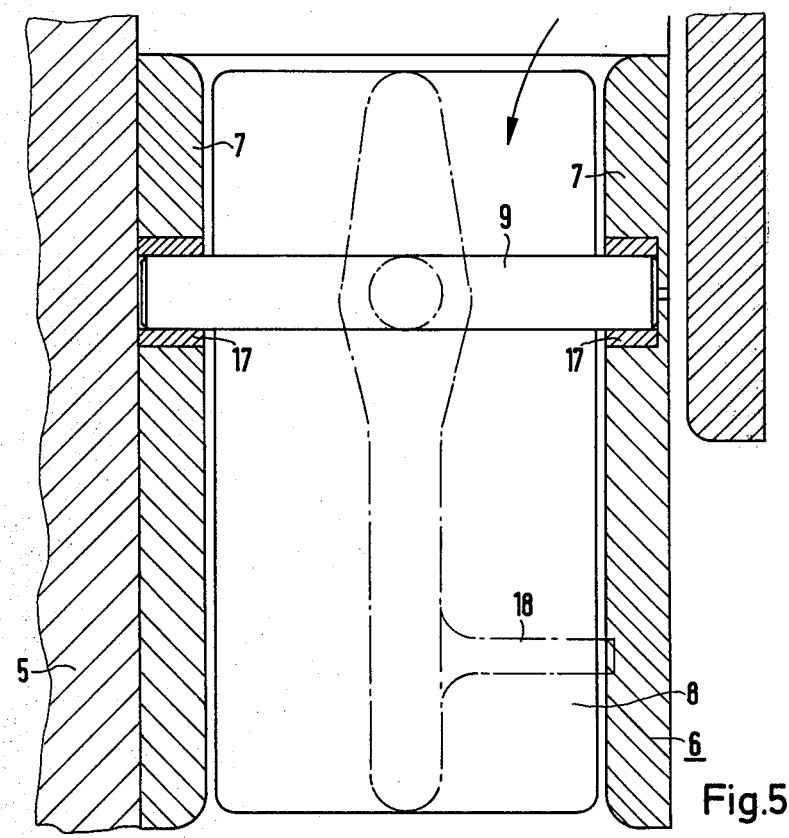
FIG. 5 is a vertical cross section on an enlarged scale of the check valve assembly when it is in the form of an annular frame encircling or surrounding the core barrel.

FIG. 5 shows that the pivot pins of the flap valves can be mounted in bushings 17, while in broken lines, the cross-sectional contour of the flap valves is represented. It can be seen that the valve plate is thicker in the area of the pivot pin, the plate having a generally streamlined contour, it being possible to make each of the flap valves in the form of a casting or forging, including all of its parts including the post 18.

In the example of the invention shown by FIGS. 1 through 4, a separate individual check valve is required for each of the cold leg nozzles of the pressure vessel.

However, in the example of FIG. 6, the check valve 6, although composed of substantially the same parts previously described, is made in the form of a large annular ring which completely surrounds or encircles the core barrel 5 at a position slightly below the nozzle 2. Instead of the annular welded ring 4, shown by FIG. 1, a horizontally positioned annular ring 20 is welded to the vessel wall 1 so as to be engaged by the outside of the annular frame 7. This provides the seal preventing bypassing of the flow around the check valve construction, the flow through the check valve in this case being in the axial direction. The spacing between the valve's frame and the ring 20, in this case, also should allow for thermal expansion and contraction, but the dimensions may be chosen so that under the operating conditions of the reactor, the frame 7 engages the ring 20 and thereby braces the core barrel 5 both structurally and to assure maintenance of the proper concentricity of the barrel 5 relative to the pressure vessel's wall.

Figure 7:
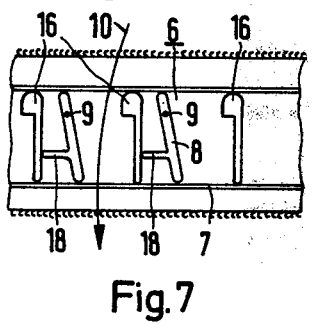
FIG. 7 is a linear development showing the flap valve of FIG. 6.

As shown by FIG. 7, the normal coolant flow 10 is axial and downwardly, in this case, normally holding the diagonally positioned flap valves 8 rigidly open and free from chattering, while, at the same time, positioning the flap valves diagonally with respect to an accidentally reversing flow, assuring closing of the flap valves.

Figure 6:
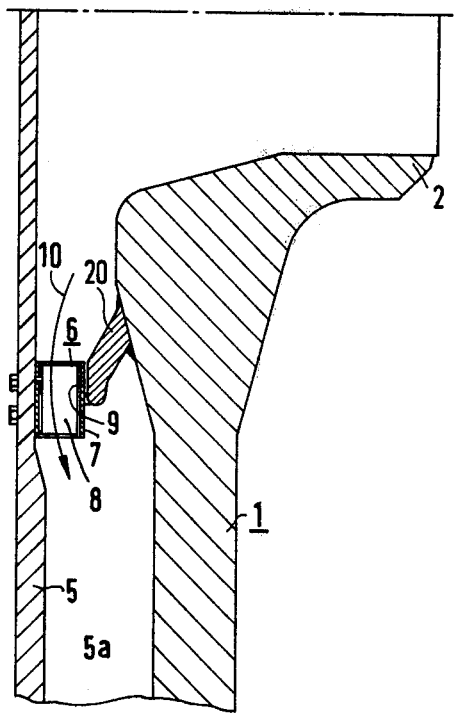
FIG. 6, on a smaller scale, shows the above-referred-to form of the invention.
Figure 8:
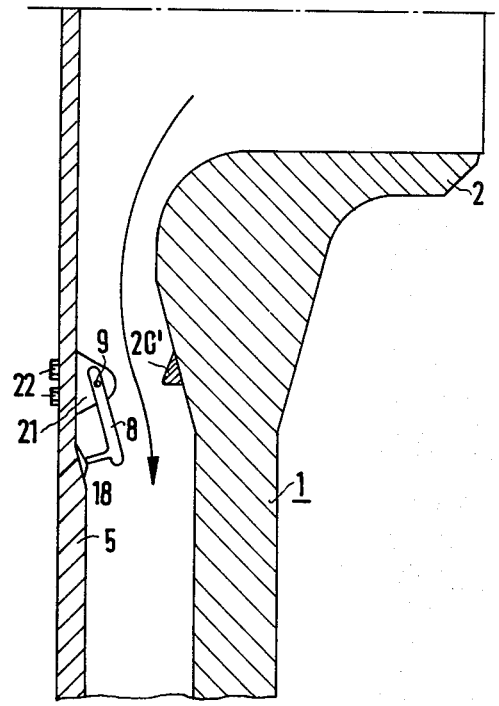
FIG. 8 is a modification of FIG. 6, such as might be used when extreme simplification is desired.
Figure 9:
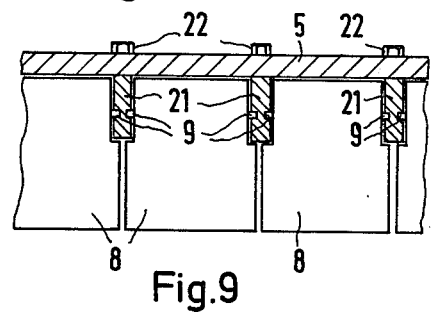
FIG. 9 is a linear development of the FIG. 8 arrangement.

Substantially the same concept is shown by FIG. 8 as is shown by FIG. 6, excepting that in the interest of economy, the flap valves 8 are, in this case, mounted by brackets 21 fixed to the core barrel 5 by screws 22. In this case, a small ring 20' is welded to the inside of the vessel's wall 1, FIG. 9 showing that the flap valves 8 can be very closely interspaced so that when closed, there can be little leakage between the various flap valves.

Figure 10:
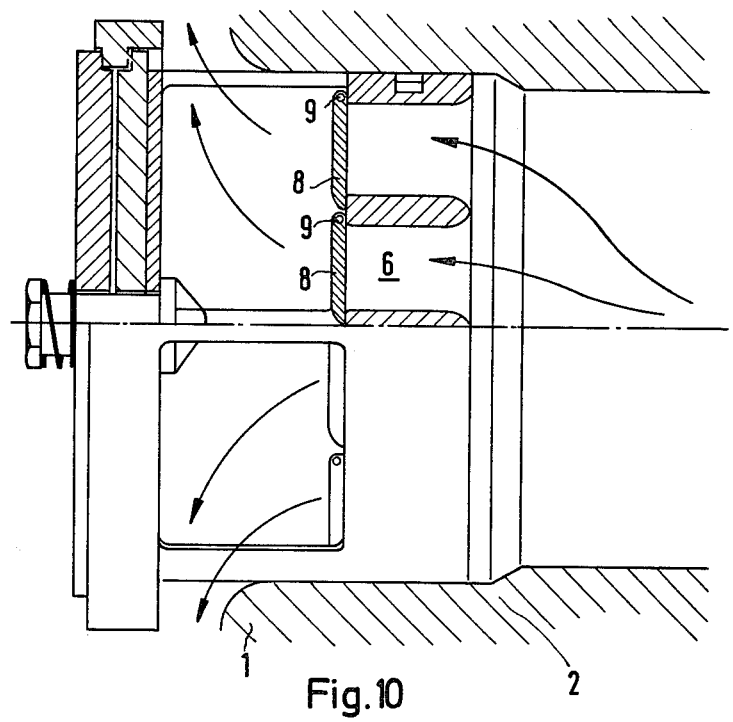
FIG. 10, with its lower half in elevation and its upper half in vertical section, shows the principles of the present invention applied to a check valve assembly inserted in the inner end of the inlet or cold leg nozzle.
Figure 11:
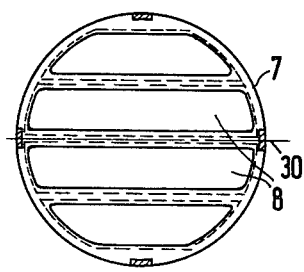
FIG. 11 is an end view of FIG. 10.

A check valve enjoying the reliability and protection of the flap valves can even be positioned in the inner end of the nozzle 2. One example is shown by FIG. 10 where the construction is built into the nozzle's inner end. The flat valves 8, in this case, are made like louvers as can be seen from FIG. 11, the horizontally elongated plates forming the flap valves being symmetrically distributed on either side of the horizontal center line 30 of the nozzle. The individual plate area of each of the flap valves may be made large enough to offer little impedance to the normal coolant flow.

Figure 12:
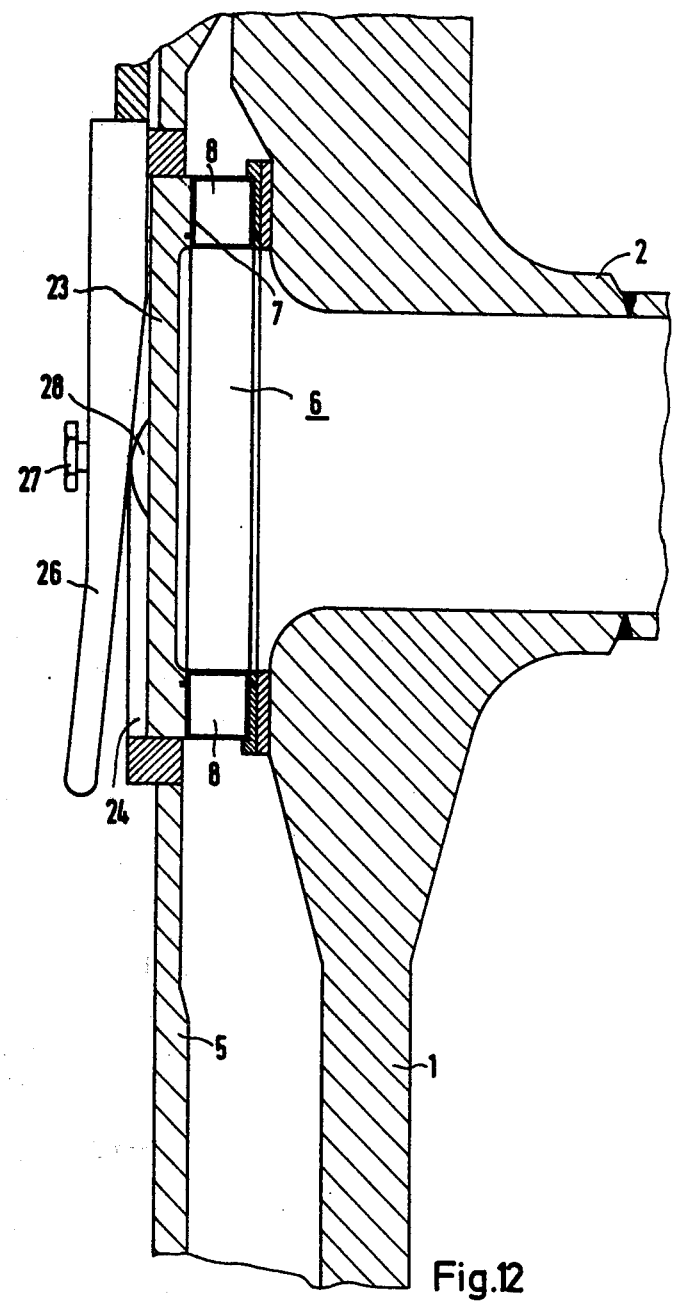
FIG. 12 shows a modification of the first form as it is shown by FIGS. 1 and 2.

FIG. 12 shows how a check valve construction similar to that shown by FIG. 1 can be reduced in diameter while still providing an adequate normal flow capacity. This is done by making the frame 7 axially thicker such as would normally prevent withdrawal of the core barrel because the check valve would have a greater thickness than that existing between the surface 1a and the outside of the core barrel, shown by FIG. 1. To permit withdrawal of the core barrel, a cover 23 which positions the check valve, is removably installed in a cutout 24 formed in the core barrel opposite to the inlet end of the nozzle 2. The cover is secured releasably by a lever 26 which bears on a projection 28 holding the cover with the check valve clamped in position. By releasing a pressure screw 27, the lever 26 can be swung to permit removal of the cover 23 and of the check valve 6 inwardly through the core barrel, thus permitting removal of the core barrel even though the check valve is of substantial thickness in its axial direction.

Obviously a check valve of any kind cannot be used effectively in connection with the pressure vessel's outlet, or hot leg, nozzle or nozzles, because the normal flow is in that direction. However, a break in the hot leg does not immediately stop the coolant flow which is normally flowing in the same direction. On the other hand, a break in the cold leg results in the coolant discharging reversely from the pressure vessel, and can possibly result in at least momentary immediate emptying of the vessel and possible endangerment of the core.

We claim:

1. A water-cooled nuclear reactor including a pressure vessel having a wall with an inside and an outside and provided with a water-coolant inlet nozzle having inner and outer ends with insides, a pipe on the outside of the vessel and connected with the outer end of the nozzle and normally providing a flow of water coolant entering the vessel through the inner end of the nozzle, and a check valve assembly for the inner end of the nozzle and enclosed within the inside of the nozzle and vessel, the assembly comprising a plurality of individually swinging flap valves and means for mounting the flap valves so that they operate in parallel and are interposed in said flow and so that they are swung open by said flow and closed by a reverse flow; said reactor having a core barrel within the said vessel, the barrel having an outside, the barrel's outside and the vessel's inside forming a space into which the inner end of the nozzle opens, said means comprising an annular frame surrounding the nozzle's inner end and substantially closing off said space, the frame forming radial passages and the flap valves being positioned to open and close these passages.

2. The reactor of claim 1 in which the annular frame has a substantially greater radius size than does the inside of the nozzle's inner end, and the frame is positioned eccentrically with respect to the nozzle's inner end.

3. The reactor of claim 1 in which the vessel's inside and the barrel's outside are cylindrical, and said frame forms a cylindrical segment and is mounted on the barrel's outside.

4. A water-cooled nuclear reactor comprising a reactor pressure vessel, having an inside, a core barrel contained by said vessel and having an outside spaced from the vessel's inside and forming there between an annular space descending inside of the vessel and having an upper end, means for closing said upper end, said vessel having at least one coolant inlet nozzle having an opening which opens into said space adjacent to its said upper end, said opening and said space forming a flow path for coolant flowing into said vessel through said nozzle, and a check valve interposed in and controlling flow through said flow path and which check valve is normally open to inward flow into said vessel through said path but closes to reverse flow through said path, said check valve being an integrated unit which can be installed as a whole in said vessel, said check valve comprising a frame extending throughout said flow path and having a plurality of individual valve openings forming a plurality of flow paths for said flow and through which the flow must pass, each of said individual valve openings having a flap valve which is pivotally mounted by said frame so as to swing freely to a position away from the valve opening under the pressure of said inward flow and so as to swing to a position closing the valve opening under the pressure of said reverse flow, each flap valve having means fixed thereto and projecting therefrom for engaging said frame so as to prevent the flap valve from swinging away from the valve opening to a position where the valve would be aligned with said flow.

5. The reactor of claim 4 in which the check valve's said frame is annular and surrounds the inlet nozzle's said opening, and the check valve is positioned as a whole by said frame being attached to the core barrel's said outside, said frame extending radially from said core barrel to a position adjacent to the pressure vessel's said inside and said valve openings extending radially with respect to said frame.

6. The reactor of claim 4 in which the check valve's said frame is annular and surrounds said core barrel below the inlet nozzle's said opening into said space, the check valve being fastened to the core barrel's said outside, said frame extending radially from said core barrel to a position adjacent to the pressure vessel's said inside and said valve openings extending axially with respect to said frame.

* * * * *